April 16, 1935.　　　　H. J. CRINER　　　　1,997,898
BREAD SLICING MACHINE

Filed March 5, 1934　　　2 Sheets-Sheet 1

April 16, 1935.   H. J. CRINER   1,997,898
BREAD SLICING MACHINE
Filed March 5, 1934   2 Sheets-Sheet 2

INVENTOR.
Harry J. Criner,
BY
Bush & Bush
ATTORNEYS.

Patented Apr. 16, 1935

1,997,898

UNITED STATES PATENT OFFICE 1,997,898

BREAD SLICING MACHINE

Harry J. Criner, Davenport, Iowa, assignor of one-half to A. G. Bush, Davenport, Iowa Application March 5, 1934, Serial No. 714,110

14 Claims. (Cl. 146—153)

My invention relates to improvements in bread slicing machines in which alternate series of reciprocating blades are utilized to slice an entire loaf of bread at one operation.

The objects of my invention are:

1. To provide a bread slicing machine of superior efficiency and simplicity that may be constructed in small size suitable for counter or table use and which may be operated at high speed;

2. To provide a double throw crank shaft for operating the alternating series of blades which will drive them in practically a straight line longitudinally.

Other objects will appear from the following description.

I accomplish these objects by the mechanism illustrated in the accompanying drawings, in which,—

Figure 3 is an enlarged detail plan view of a portion of the crossheads, guides and rolls.

Figure 4 is a detail plan view of a portion of the bread chute;

Figure 5 is a detail of one of the guides for the bread chute;

Figure 6 is a detail of an oilless bearing block or guide for the upper ends of the blades;

Figure 9 is a detail showing an alternate form of guides having curved faces to reduce the amount of deviation of the blade pivots from the center line of the blades during their travel.

Figure 1:
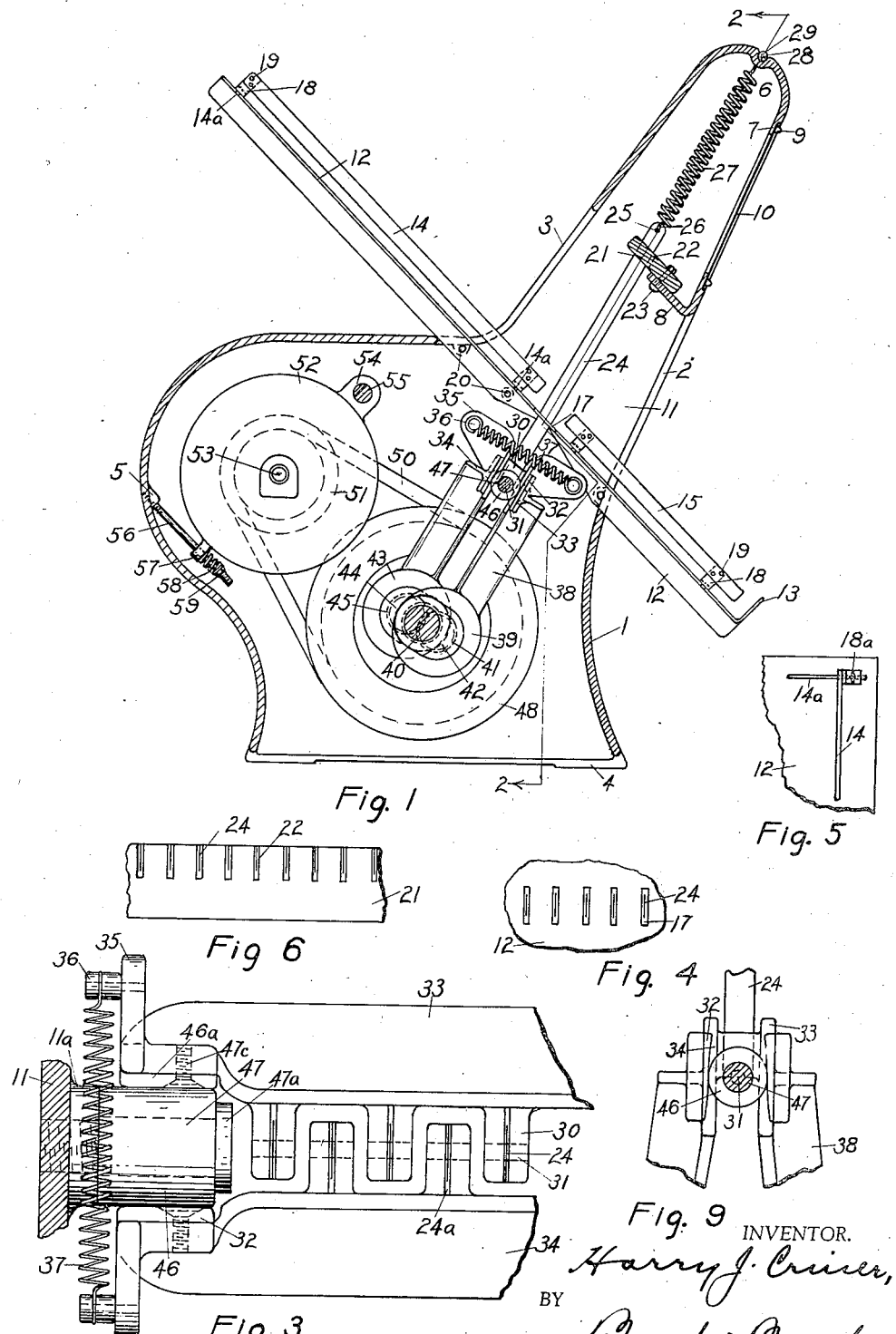
Figure 1 is a vertical section of my machine on the line 1—1 of Figure 2.
Figure 2:
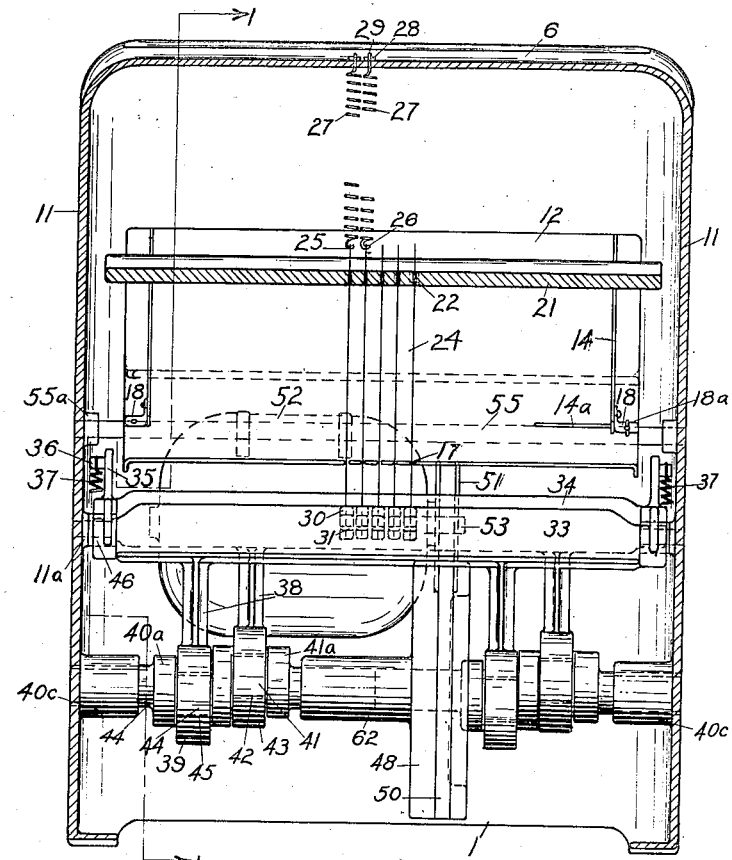
Figure 2 is a cross-section on the line 2—2 of Figure 1.

My apparatus comprises a housing, 1, composed of front, rear and side walls, with feet, 4, cast integral therewith. For convenience the right end of Figure 1 is referred to as the front of the machine and the left as the rear.

The housing, 1, is preferably composed of a casting of aluminum or other suitable material, with side walls, 11, and having front and rear openings, 2 and 3, in the front and rear walls respectively, to permit the passage of the bread chute and the bread through the machine.

Bearings, 40c, are united to the side walls, 11, and in these bearings a crank-shaft, 40, is mounted having double cranks near each end thereof. The crank-shaft, 40, may be a one piece crank-shaft or it may be divided at the middle and the two pieces driven in unison by a sleeve, 62, or other suitable connection.

This sleeve is preferably formed integral with a fly or pulley wheel, 48, which may be driven by a belt, 50, from a drive pulley, 51, operated by a motor, 52, driving a shaft, 53, mounted in suitable bearings in the housing of the motor, 52. The motor may be secured upon a supporting lug, 54, mounted upon a cross-shaft, 55, the ends of which are secured in suitable bushings, 55a, united to the side walls of the housing.

Resilient adjusting means to control the position of the motor, are shown in Figure 1 and comprise a threaded bar, 56, one end of which is secured in a boss, 5, formed integral with the rear wall of the housing and the opposite end of which passes through an opening in a lug, 57, formed integral with the motor housing. The inner end of the bar, 56, is threaded and carries an adjusting nut, 59, and a coiled spring is mounted upon the bar, 56, between the adjusting nut, 59, and the lug, 57.

An inclined bread chute, 12, is mounted upon the housing, being secured thereto by bolts or rivets, 20. This bread chute may be formed of one piece or may be split on the middle line. Upper and lower guides, 14 and 15, are mounted upon brackets, 18, which are adjustably mounted over slots; 14a, cut in the bread chute, and the lower end of the bread chute may be provided with an upturned flange, 13, as a stop, if desired. The guides, 14 and 15, are arranged to slide laterally and thumb screws, 18a, are mounted in the brackets, 18, to secure the brackets in their desired adjusted positions.

Upon the crank pins, 42 and 44, I mount oilless bearings, 45, or roller bearings as preferred, which carry the lower ends of the connecting rods, 38. The connecting rods are arranged in oppositely disposed pairs, the front pair carrying a crosshead, 33, and the rear pair carrying a crosshead, 34. These crossheads may be cast integral with their relative connecting rods or otherwise suitably united thereto. The crossheads are preferably formed T-shaped in section with the flat head of the T on the inner side. Rolls, 46, are mounted upon suitable pivots at opposite sides of the machine and the crossheads, 33 and 34, bear against these rolls and are held in contact therewith by springs, 37, mounted upon the pins, 36, secured in arms, 35, which are formed integral with the crossheads, 33 and 34, respectively.

The rolls, 46, are preferably constructed with a diameter corresponding closely to the diametrical travel of the crank pins, 44 and 42.

Each crosshead, 33 and 34, has slotted lugs, 30, extending inwardly therefrom in which the cutting blades, 24, are pivotally mounted on pivots, 31.

The lugs, 30, upon the crossheads, are arranged in series, those of one series alternating with those of the other series and the blades being so proportioned that the cutting edges of all the blades will travel longitudinally in the same plane.

The upper ends of the cutting blades, 24, are severally pivotally united to the lower ends of the springs, 27. The upper ends of the blades have openings, 25, formed therein through which hooks, 26, formed upon the lower ends of the springs, 27, may pass. The upper ends of the springs, 27, are mounted in the upper end of the housing, 1, by pins, 28, which pass through hooks, 29, formed in the upper ends of the springs, the upper end of the housing being slotted or provided with suitable apertures to permit the upper ends of the springs to pass through same, and having a groove, 6, which acts to retain the pins, 28.

Oilless bearing blocks, 21, are mounted upon brackets, 8, united to the housing, and are provided with slots, 22, through which the upper ends of the cutting blades, 24, may travel.

Figures 7, 8:
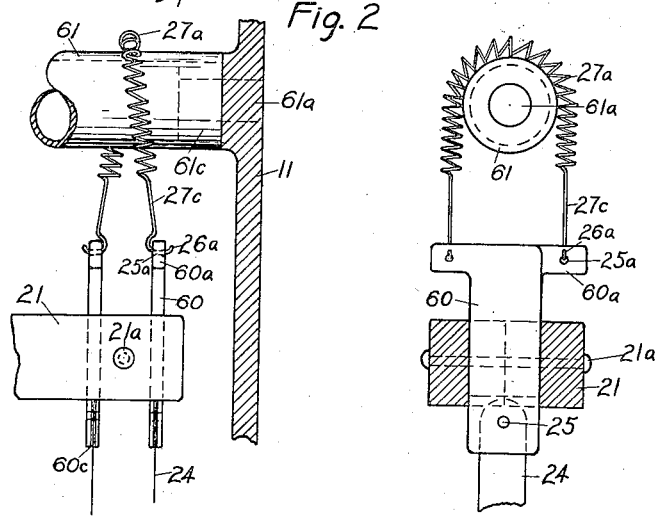
Figures 7 and 8 are enlarged details of alternate forms of spring attachments for the upper ends of the cutting blades.

In Figures 7 and 8 I have shown an alternative form of spring arrangement which will permit a reduction of the height of the machine. This comprises a cross-shaft or roll, 61, extending transversely of the machine having its ends, 61a, reduced in size and mounted in oilless bearings, 61c.

Coiled springs, 27a, pass over this roll and the lower ends of the springs are respectively attached to the upper ends of oppositely reciprocating cutting blades, 24, or to guide blocks united to the upper ends of the cutting blades by pivots, 25, so that each spring exerts upward tension upon two cutting blades and as the springs are all similarly mounted and connected, it is obvious that the downward motion of one series of blades occurring while the other series of blades is moving upwardly, will tend to cause a partial revolution of the shaft, 61, which will revolve in opposite directions alternately to correspond with the movement of the cutting blades. This arrangement will reduce the number of springs, as well as to permit a substantial shortening of the housing.

I prefer to face the bearing portions of the crossheads with hardened steel strips, 32, which bear against the rolls, 46. In Figure 9 I have shown these facing strips curved to reduce the front and rear movement of the crossheads and thereby the front and rear movement of the lower ends of the cutting blades. With the straight facing strips, 32, there will be a slight front and rear movement of the lower ends of the cutting blades, probably not to exceed one-thirty-second of an inch, but even this movement can be almost entirely obviated by curving the facing strips, 32, as shown in Figure 9, the degree of curvature, of course, being proportional to the relative sizes of the parts and the length of travel of the blades.

In the operation of my machine, the bread is placed upon the chute, 12, and is fed by gravity to the cutting blades, 24, the motor being started before the bread is placed upon the chute so as to permit the blades to attain full speed before the bread reaches them. The motor driving the crank shaft will cause the connecting rods to drive the cutting blades connected to them in alternation and the springs, 27, will exert a constant tension upon the saw blades in a general upward direction.

This constant upward tension upon the saw blades will keep the connecting rod bearings in continuous contact with the cranks at all times and will prevent the slapping motion that otherwise would occur as soon as there was any wear of the crank pins or the connecting rod bearings in contact with the crank pins. This constant tension not only tends to prevent wear due to pounding, but also greatly reduces and almost entirely obviates the vibration of the machine which would otherwise occur.

As the bread placed upon the chute descends by gravity into contact with the blades, it is sliced in the usual manner and passes through the blades onto the lower end of the chute from which it may be removed manually or mechanically as desired.

The resilient mounting of the motor will also have considerable effect in reducing vibration, as it will automatically take up any operative slack in the drive belt and obviate pounding that might arise from an imperfectly balanced armature.

The springs, 37, act to hold the crossheads in constant contact with the rollers, 46, so as to prevent any slipping motion thereof or any vibration from such slipping, as well as any vibration from pounding.

I do not limit my claims to the precise construction shown as it is obvious that various equivalents may be substituted and the form of the different parts may vary to a considerable extent without departing from the spirit of my invention.

I claim:

1. A bread slicing machine comprising a base, a housing comprising front, rear and side walls, with an angular upward extension having feed and discharge openings therein for the passage of the bread, a crank shaft mounted in the base and having a plurality of cranks formed thereon arranged in opposed pairs, a prime mover mounted within the housing adapted to drive the crank shaft, opposed pairs of connecting rods mounted upon the respective pairs of cranks extending upwardly therefrom, each pair of connecting rods having their upper ends united by a transverse crosshead formed integral therewith, inwardly projecting lugs formed upon the inner faces of the crossheads and arranged in alternation, the lugs upon each crosshead alternating with the lugs upon the opposed crosshead, all of said lugs being slotted and adapted to receive the lower ends of cutting blades pivotally mounted therein and extending upwardly therefrom, coiled tension springs having their lower ends severally pivotally united to the upper ends of the cutting blades and their upper ends severally secured to the upper end of the housing extension, a tension spring united to the cross heads at one end thereof and a corresponding tension spring united to the crossheads at the opposite end thereof adapted to exert tension upon said crossheads tending to draw them together, bearing faces formed upon the inner sides of the crossheads at each end thereof, rolls pivotally mounted upon the housing and interposed between the bearing faces at each end of the crossheads adapted to act as a guide and spacer for the crossheads, an oblique bread chute mounted in the housing extending through the feed and discharge openings and sloping downwardly from the feed to the discharge and approximately at right angles to the cutting blades, said bread chute being provided with a plurality of slots through which the cutting blades may operate in their travel, adjustable lateral guides mounted upon the bread chute and a guide-bar having a plurality of slots corresponding to the number of cutting blades adapted to guide the upper ends of the cutting blades and prevent lateral displacement thereof.

2. A bread slicing machine comprising a base, a housing united thereto, a crank shaft mounted in the base and having a plurality of cranks formed thereon arranged in opposed pairs, a prime mover mounted within the housing adapted to drive the crank shaft, opposed pairs of connecting rods mounted upon the respective pairs of cranks extending upwardly therefrom, each pair of connecting rods having their upper ends united by a transverse crosshead united thereto, means formed upon the inner faces of the crossheads and arranged in alternation to receive the lower ends of cutting blades pivotally mounted therein and extending upwardly therefrom, coiled tension springs having their lower ends severally pivotally united to the upper ends of the cutting blades and their upper ends severally secured to the upper end of the housing extension, a tension spring united to the crossheads at one end thereof and a corresponding tension spring united to the crossheads at the opposite end thereof adapted to exert tension upon said crossheads tending to draw them together, bearing faces formed upon the inner sides of the crossheads at each end thereof, rolls pivotally mounted upon the housing and interposed between the bearing faces at each end of the crossheads adapted to act as guide and spacer for the crossheads, an oblique bread chute mounted in the housing extending through the feed and discharge openings and sloping downwardly from the feed to the discharge end approximately at right angles to the cutting blades, said bread chute being provided with a plurality of slots through which the cutting blades may operate in their travel, adjustable lateral guides mounted upon the bread chute, a guide-bar having a plurality of slots corresponding to the number of cutting blades adapted to guide the upper ends of the cutting blades and prevent lateral displacement thereof.

3. A bread slicing machine comprising a base, a housing united thereto, a crank shaft mounted in the base and having a plurality of cranks formed thereon arranged in opposed pairs, a prime mover mounted within the housing adapted to drive the crank shaft, opposed pairs of connecting rods mounted upon the respective pairs of cranks extending upwardly therefrom, each pair of connecting rods having their upper ends united by a transverse crosshead united thereto, means formed upon the inner faces of the crossheads and arranged in alternation to receive the lower ends of cutting blades pivotally mounted therein and extending upwardly therefrom, springs having one end united severally to the upper ends of the cutting blades and one end secured to the housing extension, a tension spring united to the crossheads at one end thereof and a corresponding tension spring united to the crossheads at the opposite end thereof adapted to exert tension upon said crossheads tending to draw them together, bearing faces formed upon the inner sides of the crossheads at each end thereof, rolls pivotally mounted upon the housing and interposed between the bearing faces at each end of the crossheads adapted to act as a guide and spacer for the crossheads, an oblique bread chute mounted in the housing extending through the feed and discharge openings and sloping downwardly from the feed to the discharge end approximately at right angles to the cutting blades, said bread chute being provided with a plurality of slots through which the cutting blades may operate in their travel, adjustable lateral guides mounted upon the bread chute, a guide-bar having a plurality of slots corresponding to the number of cutting blades adapted to guide the upper ends of the cutting blades and prevent lateral displacement thereof and means to carry the bread to and through the cutting blades.

4. A bread slicing machine comprising a base, a housing united thereto, a crank shaft mounted in the base and having a plurality of cranks formed thereon arranged in opposed pairs, a prime mover mounted within the housing adapted to drive the crank shaft, opposed pairs of connecting rods mounted upon the respective pairs of cranks extending upwardly therefrom, each pair of connecting rods having their upper ends united by a transverse crosshead formed integral therewith, inwardly projecting lugs formed upon the inner faces of the crossheads and arranged in alternation, the lugs upon each crosshead alternating with the lugs upon the opposed crosshead, all of said lugs being slotted and adapted to receive the lower ends of cutting blades pivotally mounted therein and extending upwardly therefrom, coiled tension springs having their lower ends severally pivotally united to the upper ends of the cutting blades and their upper ends severally secured to the upper end of the housing extension, means united to the crossheads adapted to exert tension upon the crossheads tending to draw the crossheads together, bearing faces formed upon the inner sides of the crossheads at each end thereof, rolls pivotally mounted upon the housing and interposed between the bearing faces at each end of the crossheads adapted to act as a guide and spacer for the crossheads, an oblique bread chute mounted in the housing extending through the feed and discharge openings and sloping downwardly from the feed to the discharge end approximately at right angles to the cutting blades, said bread chute being provided with a plurality of slots through which the cutting blades may operate in their travel, adjustable lateral guides mounted upon the bread chute, and a guide-bar having a plurality of slots corresponding to the number of cutting blades and adapted to prevent lateral displacement thereof.

5. A bread slicing machine comprising a base, a housing united thereto, a crank shaft mounted in the base and having a plurality of cranks formed thereon arranged in opposed pairs, a drive pulley mounted upon the crank shaft, a motor mounted within the housing carrying a drive pulley upon the motor shaft, a drive belt mounted upon the motor drive pulley and the shaft pulley adapted to drive the shaft pulley, opposed pairs of connecting rods mounted upon the respective pairs of cranks extending upwardly therefrom, each pair of connecting rods having their upper ends united by a transverse crosshead formed integral therewith, inwardly projecting lugs formed upon the inner faces of the crossheads and arranged in alternation, the lugs upon each crosshead alternating with the lugs upon the opposed crosshead, all of said lugs being slotted and adapted to receive the lower ends of cutting blades pivotally mounted therein and extending upwardly therefrom, coiled tension springs having their lower ends severally pivotally united to the upper ends of the cutting blades and their upper ends severally secured to the upper end of the housing extension, a pair of arms united to each crosshead at opposite ends thereof and corresponding arms mounted at the respective ends of the opposing crosshead, a tension spring united to the opposed arms at one end of the crosshead and a corresponding tension spring united to the opposed arms at the opposite end of the crosshead adapted to exert tension upon said arms tending to draw the crossheads together, bearing faces formed upon the inner sides of the crossheads at each end thereof, rolls pivotally mounted upon the housing and interposed between the bearing faces at each end of the crossheads adapted to act as a guide and spacer for the crossheads, and means to carry the bread to and through the cutting blades.

6. A bread slicing machine comprising a base, a housing united thereto, a crank shaft mounted in the base and having a plurality of cranks formed thereon arranged in opposed pairs, a drive pulley mounted upon the crank shaft, a motor mounted within the housing carrying a drive pulley upon a motor shaft, a drive belt mounted upon the motor drive pulley and the shaft pulley adapted to drive the shaft pulley, opposed pairs of connecting rods mounted upon the respective pairs of cranks extending upwardly therefrom, each pair of connecting rods having their upper ends united by a transverse crosshead united thereto, means formed upon the inner faces of the crossheads and arranged in alternation, to receive the lower ends of cutting blades pivotally mounted therein and extending upwardly therefrom, springs having one end united severally to the upper ends of the cutting blades and one end secured to the housing, means united to the crossheads adapted to exert tension upon the crossheads tending to draw the crossheads together, bearing faces formed upon the inner sides of the crossheads at each end thereof, rolls pivotally mounted upon the housing and interposed between the bearing faces at each end of the crossheads adapted to act as a guide and spacer for the crossheads and means to carry the bread to and through the cutting blades.

7. A bread slicing machine comprising a base, a housing comprising front, rear and side walls, with an angular upward extension having feed and discharge openings therein for the passage of the bread, a crank shaft mounted in the base and having a plurality of cranks formed thereon arranged in opposed pairs, a drive pulley mounted upon the crank shaft, a motor mounted within the housing carrying a drive pulley upon the motor shaft, a drive belt mounted upon the motor drive pulley and the shaft pulley adapted to drive the shaft pulley, opposed pairs of connecting rods mounted upon the respective pairs of cranks extending upwardly therefrom, each pair of connecting rods having their upper ends united by a transverse crosshead united thereto, means formed upon the inner faces of the crossheads and arranged in alternation to receive the lower ends of cutting blades pivotally mounted therein and extending upwardly therefrom, springs having one end united severally to the upper ends of the cutting blades and one end secured to the housing extension, means united to the crossheads adapted to exert tension upon the crossheads tending to draw the crossheads together, bearing faces formed upon the inner sides of the crossheads at each end thereof, rolls pivotally mounted upon the housing and interposed between the bearing faces at each end of the crossheads adapted to act as a guide and spacer for the crossheads and means to carry the bread to and through the cutting blades.

8. In a bread slicing machine, the combination with a housing, of a crank shaft mounted therein having a plurality of cranks formed thereon and arranged in opposed pairs, opposed pairs of connecting rods mounted upon the respective pairs of cranks and extending upwardly therefrom, each pair of connecting rods having their upper ends united by a cross-head formed integral therewith, separate series of cutting blades extending upwardly therefrom, having their lower ends pivotally united to the crossheads respectively, and resilient means united to the housing and to the upper ends of the cutting blades adapted to exert a constant tension upon the blades, and means to actuate the crank shaft.

9. In a bread slicing machine, the combination with a housing, of a crank shaft mounted therein, having a plurality of cranks formed thereon and arranged in opposed pairs, opposed pairs of connecting rods mounted upon the respective pairs of cranks and extending upwardly therefrom, each pair of connecting rods having their upper ends united by a crosshead formed integral therewith, a separate series of cutting blades extending upwardly therefrom, having their lower ends pivotally united to the crossheads respectively, resilient means united to the housing and to the upper ends of the cutting blades adapted to exert a constant tension upon the blades, means to actuate the crank shaft and means united to the crossheads adapted to exert tension thereon tending to draw the crossheads together.

10. In a bread slicing machine, the combination with a housing, of a crank shaft mounted therein having a plurality of cranks formed thereon and arranged in opposed pairs, opposed pairs of connecting rods mounted upon the respective pairs of cranks and extending upwardly therefrom, each pair of connecting rods having their upper ends united by a crosshead formed integral therewith, a separate series of cutting blades extending upwardly therefrom having their lower ends pivotally united to the crossheads respectively, resilient means united to the housing and to the upper ends of the cutting blades adapted to exert a constant tension upon the blades, means to actuate the crank shaft, means united to the crossheads adapted to exert tension thereon tending to draw the crossheads together, bearing faces formed upon the inner sides of the crossheads at each end thereof, and rolls pivotally mounted upon the housing and interposed between the bearing faces at each end of the crosshead adapted to act as guides and spacers for the crossheads.

11. In a bread slicing machine, the combination with a housing, of a pair of crossheads therein with supporting means therefor, separate series of cutting blades extending upwardly therefrom, having their lower ends pivotally united to the crossheads respectively, resilient means united to the housing and to the lower ends of the cutting blades adapted to exert a constant tension upon the blades, additional resilient means united to the crossheads adapted to exert tension thereon tending to draw the crossheads together, and means for reciprocating the crossheads in alternation in spaced relation to each other.

12. In a bread slicing machine, the combination with a housing, of a crank shaft mounted therein, having a plurality of cranks formed thereon and arranged in opposed pairs, opposed pairs of connecting rods mounted upon the respective pairs of cranks and extending upwardly therefrom, each pair of connecting rods having their upper ends united by a crosshead formed integral therewith, separate series of cutting blades extending upwardly therefrom, having their lower ends pivotally united to the crossheads respectively, a roll revolvably mounted in the housing above the cutting blades, a plurality of coiled tension springs passing over the roll and each spring having its ends pivotally attached respectively to the upper ends of two oppositely moving blades, means to actuate the crank shaft and means united to the crossheads adapted to exert tension thereon tending to draw the crossheads together.

13. In a bread slicing machine, the combination with a housing, of a crank shaft mounted therein having a plurality of cranks formed thereon and arranged in opposed pairs, opposed pairs of connecting rods mounted upon the respective pairs of cranks and extending upwardly therefrom, each pair of connecting rods having their upper ends united by a frame member formed integral therewith, cutting blades attached to the frame member adapted to be actuated thereby, a roll revolvably mounted in the housing above the cutting blades, a plurality of coiled tension springs passing over the roll and each spring having its ends pivotally attached respectively to the upper ends of two oppositely moving blades, and means to actuate the crank shaft.

14. In a bread slicing machine, the combination with a housing, of a crank shaft mounted therein having a plurality of cranks formed thereon and arranged in opposed pairs, opposed pairs of connecting rods mounted upon the respective pairs of cranks and extending therefrom, each pair of connecting rods having their free ends united by a crosshead formed integral therewith, separate series of cutting blades extending therefrom, having one end united to the crossheads respectively, and resilient means united to the housing and to the free ends of the cutting blades adapted to exert a constant tension upon the blades, and means to actuate the crank shaft.

HARRY J. CRINER.